United States Patent [19]

Rump

[11] Patent Number: 4,857,693
[45] Date of Patent: Aug. 15, 1989

[54] METHOD OF FORMING STUB ENDS

[75] Inventor: Jerome R. Rump, Crestview Hills, Ky.

[73] Assignee: Jero Incorporated, Florence, Ky.

[21] Appl. No.: 136,466

[22] Filed: Dec. 22, 1987

Related U.S. Application Data

[63] Continuation of Ser. No. 942,930, Dec. 22, 1986, abandoned, which is a continuation of Ser. No. 709,050, Mar. 7, 1985, abandoned.

[51] Int. Cl.⁴ .............................................. B23K 9/04
[52] U.S. Cl. ............................ 219/76.12; 219/76.11; 219/76.14; 219/137 R
[58] Field of Search ................. 219/76.1, 76.11, 76.12, 219/76.14, 137 R

[56] References Cited

U.S. PATENT DOCUMENTS

| | | | |
|---|---|---|---|
| 2,491,878 | 12/1949 | Spagnola | 219/76.1 |
| 2,813,190 | 11/1957 | Felmley | 219/76.1 |
| 3,139,511 | 6/1964 | Kudelko | 219/76.12 |
| 3,316,381 | 4/1967 | Gibson | 219/76.14 |
| 3,428,774 | 2/1969 | Faust et al. | 219/76.1 |
| 4,409,466 | 10/1983 | Commeau | 219/137 R |

OTHER PUBLICATIONS

Cary, Howard B. *Modern Welding Technology*. Englewood Cliffs, New Jersey: Prentice-Hall Inc., 1979, pp. 11-12, 715.

Primary Examiner—Clifford C. Shaw
Attorney, Agent, or Firm—Wood, Herron & Evans

[57] ABSTRACT

A method of forming stub ends used for joining pipes together by depositing successive layers of weld metal on the outer circumference of a rotating length of pipe. Initial layers having a common forward edge but of decreasing width are deposited to provide metal for the machining of a radius joining the flange to the pipe. Thereafter, successive layers of weld metal of substantially the same width and the same common forward edge are deposited to form the flange. The method is preferably practiced by inert gas shielded pinch arc welding to provide an integral flanged stub end made up completely of weld metal. The resulting structure is substantially uniform and homogeneous with a desirable grain structure, and is pore and defect free. The method further provides economical manufacture of flanged stub ends with relatively little waste of materials.

6 Claims, 3 Drawing Sheets

METHOD OF FORMING STUB ENDS

This is a continuation of application Ser. No. 942,930 filed 12.22.86 now abandoned which is a continuation of application Ser. No. 709,050, filed 3/7/85, now abandoned.

BACKGROUND OF THE INVENTION

This invention relates to the formation of stub ends for tubes and pipes and, more particularly, to a method of forming lap joint stub ends.

In industry today, it is known to form "stub ends" which are short lengths of pipe having a flange at one end useful for connecting pipes together in the field during construction. That is, in the construction of a chemical plant, for example, relatively short lengths of pipe are provided with a flange at one end. The opposite or non-flanged end of the pipe is then welded in the field to a relatively long piece of non-flanged pipe to provide that long pipe with a flanged end for connecting that pipe to a like flanged end welded to the end of another pipe. The advantage of using stub ends are several-fold. Because the length of pipe used to form the stub end is relatively short, only several inches, it is easier to handle when forming the flanged end than a relatively long piece of pipe, for example, up to 20 feet. The stub ends being short are also relatively easy to store and ship for connection to pipes in the field.

It is old to provide short lengths of pipe with a flange to form stub ends by taking a flat piece of metal, cutting out an annulus having an inside diameter generally that of the outside diameter of the pipe, beveling the edges of the inner circumference of the annulus and welding the annulus to the outside of the pipe. This prior art method of forming stub ends, however, has a number of disadvantages including a relatively large amount of waste of materials, complicated, difficult and time consuming multi-step welding and inspection processes, the lack of integrity of the flange with respect to the pipe, distortion o the flange, and loss of needed properties such as corrosion resistance. That is, in this particular industry, it is common for the stub ends to be formed of a material which has high strength and high corrosion resistance to withstand the pressure and corrosive properties of materials passing through the pipe. Accordingly, the pipe and flange materials are typically formed of relatively expensive materials such as high strength, low alloy nickel alloys. Other alloys could be used. When cutting annuluses from a flat plate, the material cut out to form the center hole of the annulus is wasted as is the material between annuluses. With relatively costly alloys, this makes the process unattractively expensive. Moreover, welding of the annuluses to the pipe ends is a difficult process requiring welding from the backside as well as the front. Several welds are necessary to provide the desired connection. Thereafter, the weld material is machined to provide the appropriate radius between the pipe and flange for strength purposes, and the entire stub end must be heat treated to remove the effects of the heat of the multiple welding processes. The stub end must then be subjected to visual and x-ray analysis to insure the integrity of the weld. This process can take several weeks and results often in a relatively high rate of rejection because of internal porosity and lack of weld integrity. Moreover, the effects of the sequential heating and cooling processes tend to warp the flange contributing to problems of weld integrity and requiring additional heat treating and machining and waste of material. Still further, the effects of weld heat and of heat treating can reduce the corrosion resistance of the material.

SUMMARY OF THE INVENTION

In contrast to the prior art, the present invention provides a much improved method of forming stub ends which eliminates the many disadvantages of the prior art. In its general aspect, the method of the present invention comprises the building up of a flange on a length of pipe by rotating the pipe and laying down a number of successive layers of weld metal, one on top of another, to form the flange. Thereafter, the weld metal is machined to provide the appropriate radius between the flange and pipe end. Accordingly, the entire flange is formed solely of weld metal, typically of the same composition as that forming the pipe, thus forming an all weld metal flange integral with the pipe.

In a presently preferred form of the invention, a length of pipe is rotated beneath one or more metal inert gas welding heads of a pinch arc welder. The heads are continuously fed with weld wire and are oscillated back and forth along the length of the pipe to provide a first layer of weld metal of predetermined width. The head is then raised and its center shifted toward the flange end of the pipe and again oscillated but this time a shorter distance to provide a second layer upon the first having a width less than the width of the first layer but with a common forward edge. This process of raising the weld head and shifting its center toward the flange end of the pipe is repeated to form successive built up layers of weld metal. When a proper height of weld metal build up is reached to provide for the radius between the flange and pipe, the head is then oscillated on a fixed center line and successively raised to build up successive layers of weld metal forming the outer annulus of the flange. Again, these layers have a common forward edge common with the underlying layers. Thereafter, the stub ends are cut from the length of pipe by cutting the pipe along the juncture of the pipe and the relatively flat flange end of the pipe. The layers of weld metal, which are integral one to another, are machined to provide the proper radius and the flat flange surface for joining the stub end to a like end in the field.

The method of the present invention provides a number of benefits not found in the prior art. First, the entire flange is formed fully of weld metal. There is no distortion of a pre-formed flange due to heat of welding and no porosity or internal defects between the flange and the pipe. Because there is no distortion, there is no need for any subsequent heat treatments. Moreover, there is no loss because of waste of material such as the centers and corners of the flange blank. Machining of the material is reduced, and the stub ends can be made in a matter of minutes as opposed to the many hours required by prior art processes. Still further, there are no heat effects on the alloys which detract its corrosion resistant properties.

As stated above, it is preferred that a pinch arc welder be utilized in the process. A pinch arc welder provides a very stable arc between the gas shielded end of the weld wire and the pipe and successive layers of weld metal. This permits controlled deposition of a layer of weld metal on the pipe and on successive layers of weld metal without the requirement of any mold or form to contain the layers of weld metal to prevent their running beyond the location where they are applied.

Rather, the layers of weld metal are built up with relatively clean edges particularly at the flat flanged end of the pipe. As a result, relatively little machining and consequently very little metal waste is involved in the process.

In a further embodiment of the invention, the method of the present invention permits the forming of one pipe within another having a flanged end secured to both pipes. That is, it is often required to have a pipe having relatively high internal corrosion resistance and relatively low external corrosion resistance but with relatively high wall strength. To make the pipe completely out of the high corrosion resistant material increases its cost significantly. Accordingly, the present method also contemplates making a composite pipe having one length of corrosion resistant pipe within another length of pipe having good strength but relatively low corrosion resistance with the end of the high corrosion resistant pipe extending beyond the end of the low corrosion resistant pipe and thereafter forming a flange on the end extending beyond the end of the low corrosion resistant pipe with the weld metal joining the two pipe ends together. The offset of the end of the low corrosion resistant pipe from the flange end is of a distance sufficient that when welded the low corrosion resistant material does not migrate to the flange and thus does not dilute the alloy and reduce its corrosion resistant properties.

All in all, the method of the present invention provides a superior process for forming stub ends of higher quality in substantially less time with minimal waste of material.

DETAILED DESCRIPTION OF THE INVENTION

Figure 1:
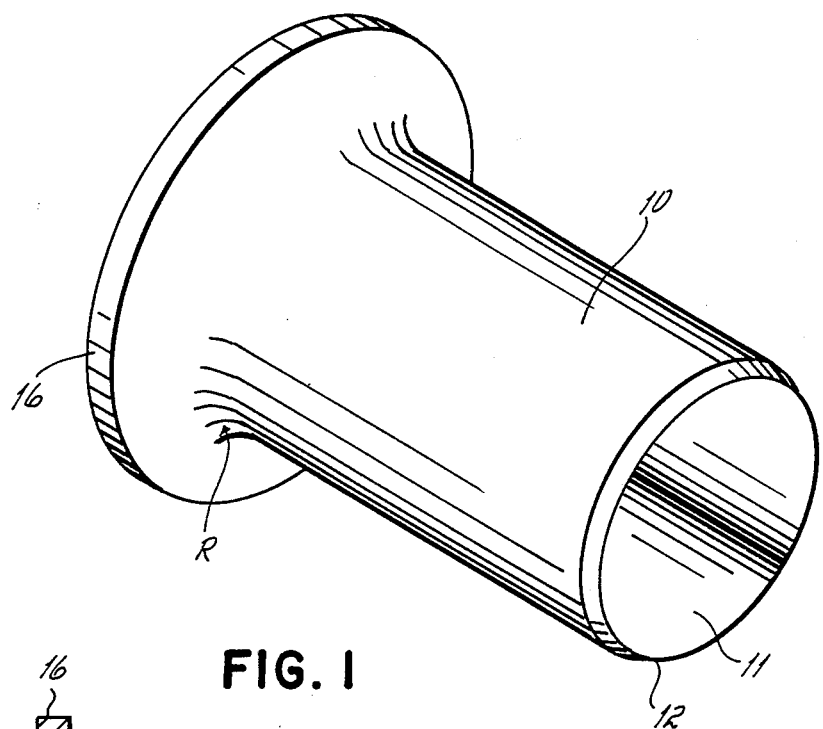
FIG. 1 is a pictorial view of the stub end.
Figure 2:
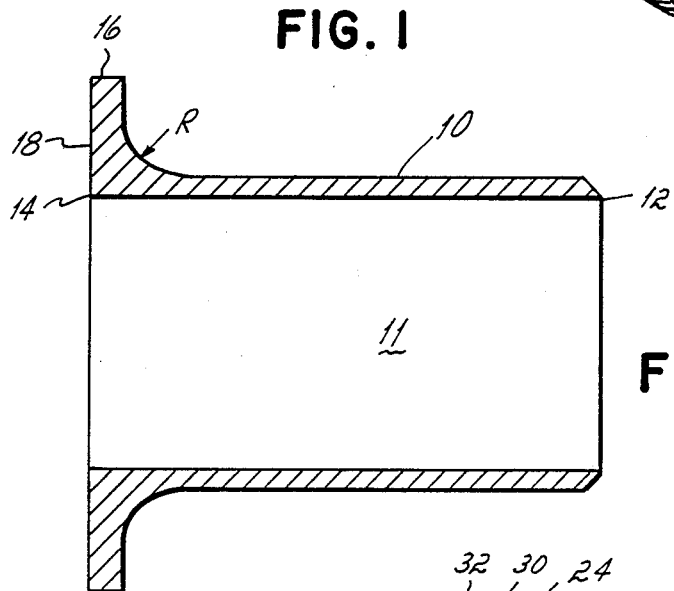
FIG. 2 is a cross-section of the stub end shown in FIG. 1.

Referring now to FIG. 1, the stub end formed by the method of the present invention comprises a length of pipe 10 having a through opening 11 and an end 12 to be welded to an end of a corresponding length of pipe in the field. Opposite end 12 is an end 14 having a flange 16 integral with pipe 10. The flange 16 includes a radius R to prevent the concentration of stresses at the flange-pipe connection. The forward face 18 of the flange 16 is substantially flat such that in the field a gasket may be placed between mating faces 18 and the two secured together by means of suitable clamps or other connecting devices. Thus, it is contemplated in use that a relatively long length of non-flanged pipe will have stub ends welded to both ends to provide for joining the pipes together.

Figure 3:
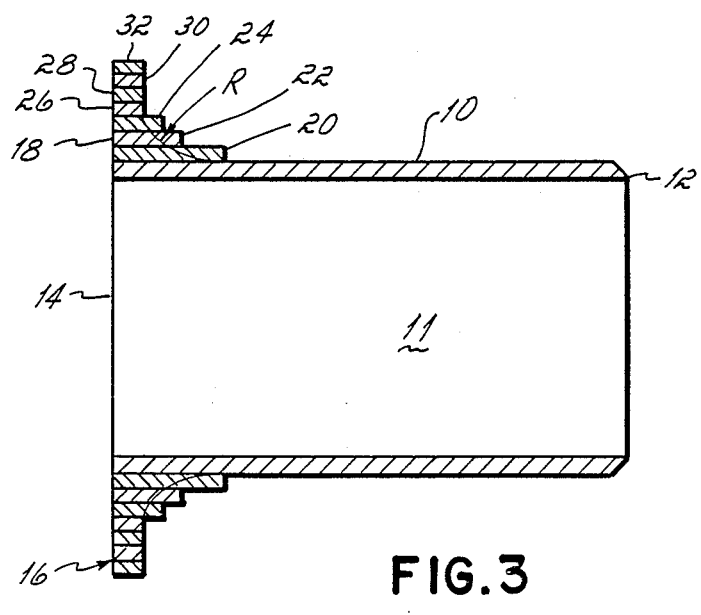
FIG. 3 is a schematic illustration in cross-sectional view of the stub end shown in FIG. 1 as manufactured by the method of the present invention and before machining.

Referring now to FIG. 3, the flange 16 is formed by depositing on the outer surface of pipe 10 at the end 14 successive layers of weld metal. The first layer 20 of weld metal is of predetermined width as deposited on the end 14 of the pipe 10. Because of the heat of welding, the first layer 20 will penetrate into and fuse to the metal of pipe 10. A next layer 22 is deposited on layer 20 beginning at the forward edge 18 of the layer 20 but having a width less than that of layer 20. Next, a third layer 24 is deposited on layer 22 again having a forward edge beginning at the edge 18 and extending back therefrom but with a width less than the width of layer 22. Next, layers 26, 28, 30 and 32 all of the same width are deposited one upon another. The width of the layers 26, 28, 30 and 32 is substantially the desired width of the finished flange 16. By depositing the successive layers 20, 22, 24 and 26, there is provided sufficient weld metal for forming the radius R (shown by the curved line in FIG. 3) between the flange 16 and the pipe 10 but with very minimal waste of material in the machining process. The forward face 18 of the flange, however, is substantially flat and requires only a little finish machining thereby again minimizing lost material.

Figure 4:
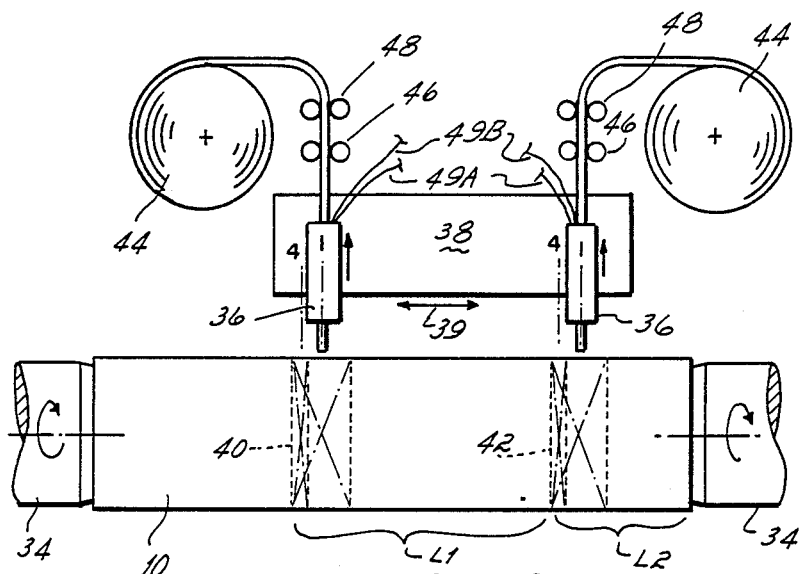
FIG. 4 is a schematic illustration of an apparatus for practicing the method of the present invention.

Referring now to FIG. 4, in practicing the method of the present invention, a length of pipe 10 to be provided with a flange is secured between two heads 34. The securement heads 34 locate the pipe substantially level such that there is a right angle between the pipe and the weld heads 36 to form a right angle flange on the pipe. The securement heads 34 rotate the pipe about its long axis during the process and also permit the circulation of water through the center 11 of the pipe 10 to reduce the heat effects of the welding process on the alloy forming the pipe. As shown in FIG. 4, two stub ends are formed simultaneously with one length of pipe. That is, the pipe 10 has deposited on it spaced successive weld layers as indicated by the dotted lines. At the completion of the process, the pipe 10 is cut along lines 40 and 42, respectively, thereby forming stub ends having a length L1 and L2, respectively. Although these lengths are shown in FIG. 4 to be different, they may be made the same in length merely by adjusting the location of the weld heads 36 with respect to the length of the pipe. In addition, one, two or more stub ends can be formed simultaneously merely by placing a desired number of weld heads 36 along the length of the pipe.

As shown in FIG. 4, two weld heads 36 are employed. These weld heads may be of standard metal inert gas construction where coils 44 of weld wire are provided for each head 36. The weld wire is continuously fed to the heads 36 by means of feed rollers 46 (shown schematically in FIG. 4). The rate of feed of the weld wire is continuously monitored at 48 and feed rollers 46 in turn controlled by standard equipment to maintain a substantially constant feed rate of weld wire. As also shown schematically in FIG. 4, electric power and inert shielding gas are provided to the weld heads 36 from external sources by lines 49A and 49B. The inert shielding gas surrounds the arc formed between the end of the weld wire and the base metal thus preventing oxidation of the metal as it is deposited. Preferably, a pinch arc welder is employed to maintain a very stable arc and thus uniform and controlled deposition of the successive layers of weld metal.

The weld heads are mounted on a platen 38 which oscillates to and fro in the direction of the arrow 39 shown in FIG. 4. This permits the deposition of a predetermined width weld metal on the outer surface of the pipe as the pipe is continuously rotated. That is, as the pipe is rotated, the oscillation of the weld heads lays down a pool of weld metal. The center line of the weld head and the oscillation distance on either side of the center line is predetermined and controlled to deposit successive layers of weld metal as the process continues.

Additionally, the platen 38 may be raised and lowered such that the weld heads 36 can be raised during the deposition process to provide the successive layers of weld metal built up one upon another.

Figure 5:
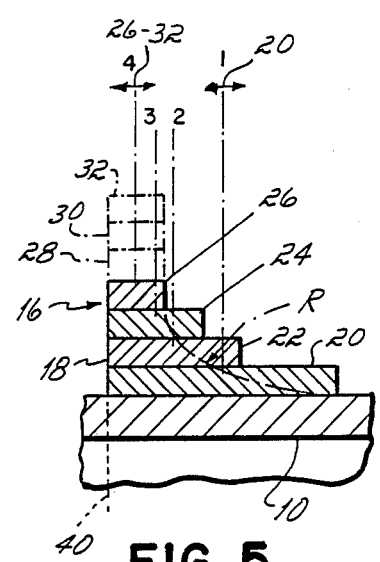
FIG. 5 is a schematic illustration in an enlarged cross-sectional view of a portion of the stub end during the manufacturing process showing the movement of the center line of the apparatus as the method is practiced.

Referring in addition to FIG. 5, the process is carried out by initially rotating the pipe 10 at a predetermined speed and oscillating the weld heads 36 a predetermined distance on either side of a center line 1 to deposit a first layer 20 of weld metal on the outer surface of the pipe 10. Once this layer is deposited, the apparatus automatically shifts the center line of the weld heads to position 2 and raises the weld head to deposit the second layer 22 on the first layer 20. By shifting the center line of oscillation of the weld heads and decreasing the oscillation width, a second layer of weld metal 22 is deposited on the first layer 20 having one edge substantially the same as the forward end of the first layer 20 but the rearward end offset forwardly from the rearward end of the first layer 20. Once the layer 22 is deposited, the apparatus automatically steps up the offset distance of the weld head with respect to the pipe and again shifts the center line of oscillation to the forward end of the flange (position 3) and decreases the oscillation width to deposit a third layer of weld metal on the second layer 22. Again, the forward shift of the oscillation center line causes the forward edge of layer 24 to be aligned with the forward edge of layers 20 and 22 but with its rearward edge being offset forwardly from the rearward edge of layer 22. Once the third layer 24 is deposited, the apparatus again automatically steps up the weld head to increase the offset distance between the head and the pipe, shifts the center line of oscillation to position 4, and again decreases the width of oscillation to deposit a fourth layer 26 on the third layer 24. Thereafter, the center line is maintained fixed in position 4 as is the width of oscillation with the weld head being successively stepped up to deposit the additional layers 28, 30 and 32 to form the flanged end 16.

On completion of the process, the pipe is cut along lines 40 and 42 to give the stub ends ready for finish machining. As a result of this process, a flange 16 is formed on the pipe which has a relatively flat forward face 18 requiring very little machining. The weld metal rearwardly thereof provides sufficient metal for machining of the radius R, however with little waste of material.

EXAMPLE

A length of schedule 40 pipeformed of a nickel base alloy, Hastelloy C-276 from Cabot Corporation of Kokomo, Ind., was secured between two mounting heads. This pipe had a two inch internal diameter. Hastelloy C-276 alloy has a nominal composition as follows: 2.5% max. cobalt, 15.5% chromium, 16.0% molybdenum, 4.0% tungsten, 5.5% iron, 0.08% max. silicon, 1.0% max. manganese, 0.01% max. carbon, 0.35% max. vanadium, and balance nickel. The pipe was mounted below two weld heads that were fed with weld wire of Hastelloy C-276. The diameter of the wire was 0.035 inch. The wire was shielded with a gas sold by AGA Gas, Inc. under the trademark TRIMIX. This gas has a nominal composition of 90% helium, 7½% argon and 2½% carbon dioxide. A pinch arc welder, PA-300 manufactured by Jero, Inc. of Cincinnati, Ohio, was employed. Such a pinch arc welder is made under one or more of the following U. S. patents, incorporated herein by reference: U.S. Pat. Nos. 3,136,884; 3,211,953; 3,211,990; 3,321,711; 3,268,842; 3,316,381 and 3,489,973. These patents disclose methods and apparatus for pinch arc welding wherein in general context a length of weld wire is provided for deposition in molten form on a workpiece by the steps of electronically coupling a capacitance between the workpiece and length of weld wire, inductively charging the capacitance when the end of the length of weld wire is out of electrical communication with the workpiece, discharging the capacitance through the weld wire to establish an arc between the end of the length of weld wire and the workpiece by bringing the end of the length of weld wire into electrical communication with the workpiece whereby the weld wire end is deposited as molten weld metal onto the workpiece while pinching off the end from the rest of the weld wire, and continuously feeding weld wire into the arc while shielding the arc from surrounding air." The PA-300 welder was operated at 70 amps, 23½ volts and a pinch of 10. The rate of feed of the weld wire was controlled at about 184 inches per minute. Water at a temperature of about 70° F. was circulated through the pipe. The pipe was initially rotated at a speed of 80 seconds per revolution. The end of the weld wire was about ⅛ inch from the surface of the pipe. The weld heads were oscillated at a rate of about 60 inches per minute. The first layer of weld metal was deposited in a width of about 11/16 inch. For deposition of the second layer, the weld heads were stepped about 1/16 to 3/32 inch; the pipe rotational speed increased to one rotation in 75 seconds; and a second layer was deposited having a width of about 7/16 inch. After deposition of this layer, the weld wire was stepped up about another 1/16 to 3/32 of an inch; the rotational speed of the pipe was increased to one revolution in 72 seconds; and a third layer deposited having a width of about 5/16 inch. On deposition of the third layer, the weld wire was stepped up another 1/16 to 3/32 of an inch; the rotational speed of the pipe was increased to about one revolution in 70 seconds and a fourth layer having a width of 3/16 inch was deposited. Successive layers of about 3/16 inch in width were then deposited to build up the flange. With each layer, the weld wire distance was stepped up an additional 1/16 to 3/32 of an inch. Because of the small amount of flow of the weld metal as deposited, a flange having a thickness of about 0.200 to 0.210 inch was formed. On completion of the flange, the pipe was removed from the heads and sectioned along the forward faces of the flanges. The stub ends were then machined to give a flange having a thickness of about 0.180 inch.

It will be recognized that in this example, the rotational speed of the pipe was increased for successive layers 20 through 26 because of the relatively smaller amounts of metal being deposited with each pass. Alternatively, the energy level could be decreased or a combination of head speed and energy level altered to accommodate the decrease in amount of metal deposited. If desired, the flange so formed can be heat treated for purposes of grain homogenation and the like, however, such treatment is not generally necessary.

Figure 8:
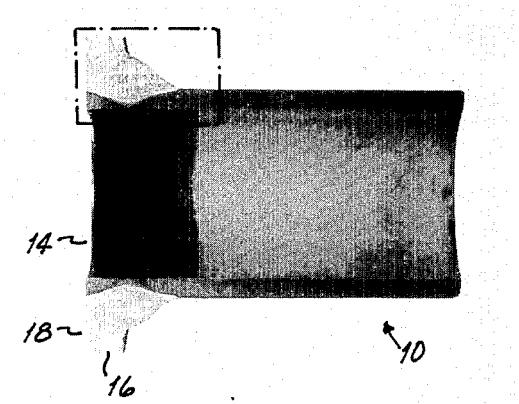
FIG. 8 is a photomicrograph of a cross-section of a stub end made according to the present invention and prior to machining taken at 1× magnification.
Figure 9:
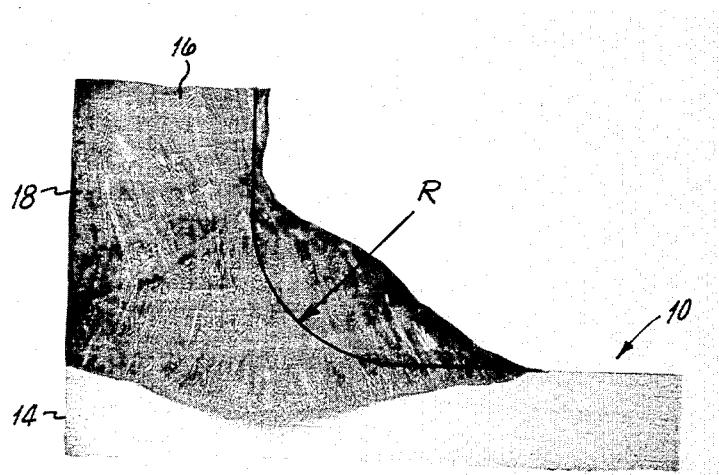
FIG. 9 is a photomicrograph of that portion boxed in FIG. 8 showing a cross-section of the stub end taken at 5× magnification.

Referring to FIGS. 8 and 9, it may be seen that in a stub end manufactured according to the invention, the deposited weld metal has good penetration into the base metal of the pipe, is pore and defect free, and the interface between the two has a high degree of integrity. Moreover as stated above and shown by FIGS. 8 and 9, the forard face 18 of the flange is relatively flat requiring relatively little machining. The back side is machined to form the radius R as shown in FIG. 9.

Figure 6:
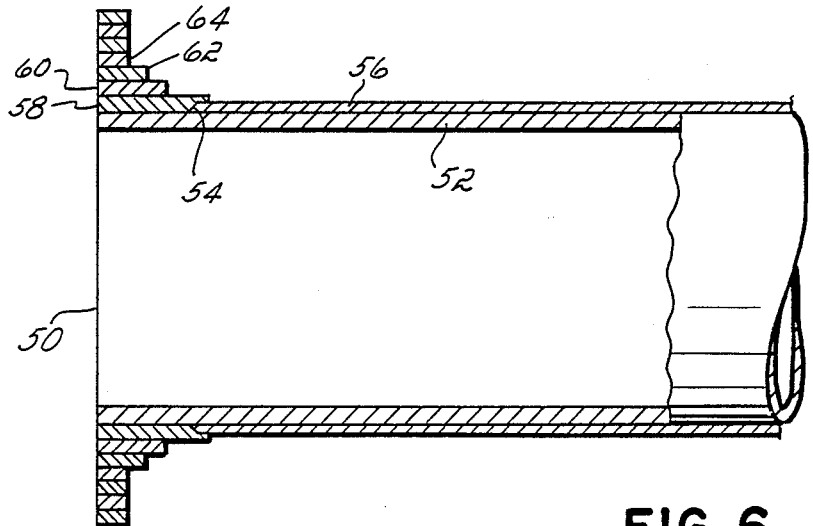
FIG. 6 is a schematic illustration in cross-sectional view of the stub end in a second embodiment of the invention before machining.
Figure 7:
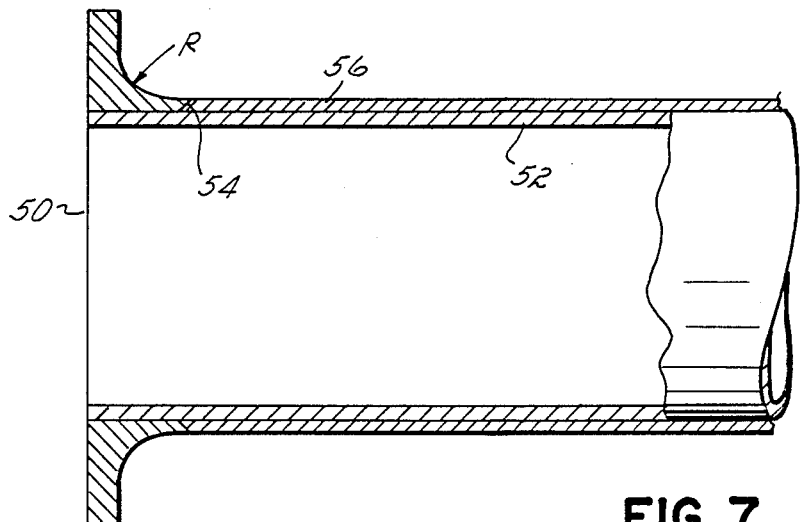
FIG. 7 is a schematic illustration in a cross-sectional view of the stub end shown in FIG. 6 after machining.

Referring now to FIGS. 6 and 7, the present invention is also useful in forming a composite pipe having an inner pipe of relatively high corrosion resistance surrounded by an outer pipe of relatively low corrosion resistance but high strength. The composite pipe provides a high strength, high corrosion resistant pipe for conveying corrosive fluids but at a lower cost than forming the pipe entirely out of the high corrosion resistant material with sufficient wall thickness to obtain the desired strength. In this embodiment, the end 50 of the high alloy pipe 52 extends beyond the end 54 of the surrounding high strength pipe 56. Successive layers of weld metal 58, 60, 62 64 . . . are deposited in the same manner as described above with the first layer 58 extending along the length of the pipe 52 extending beyond the end 54 of the high strength pipe 56 and slightly over that end 54 to join the two pipes 52, 56 together. Thereafter, the successive layers of weld metal are deposited to build up the flange at the end of the pipe 52. Preferably, this metal is of the same corrosion resistant alloy as the inner pipe 52. On completion of forming of the flange, the flange is machined to provide the desired radius R (FIG. 7). As a result, there is formed a stub end of high strength and high corrosion resistance having a flange at one end which also joins the two pipes together.

Thus having described the invention, what is claimed is:

1. A method of forming a stub end including a flange at one end thereof comprising the steps of:
    providing a length of pipe;
    electrically coupling a capacitance between said pipe and non-welded metal to be deposited on to said pipe;
    depositing on the outer circumference of said pipe a layer of molten weld metal by repeatedly (i) inductively charging said capacitance when said non-welded metal is out of electrical communication with said pipe and then (ii) bringing a portion of said non-welded metal into electrical communication with said pipe to discharge said capacitance through said non-welded metal whereby to deposit said metal portion onto said pipe as a portion of a said layer of molten weld metal while pinching off said metal portion from the rest of said non-welded metal;
    depositing a plurality of successive said layers of molten weld metal each having a substantially common first edge and successively decreasing widths until a sufficient amount of metal is deposited to permit the machining of a radius joining said flange to said pipe;
    each of said layers having a substantially common first edge thereby forming a generally flat forward face of said flange opposite said radius.

2. The method of claim 1 whereby said molten weld metal is deposited simultaneously at a plurality of spaced locations along the length of said pipe and comprising the further step of cutting through said pipe at the location of said first edges of said layers of weld metal to form a plurality of individual stub ends.

3. The method of claim 1 wherein said pipe includes an inner and outer member an wherein said flange is formed on an end of said inner member extending beyond the end of said outer member, said first layer of weld metal joining the end of said outer member to said inner member.

4. A method of forming a stub end including a flange at one end thereof comprising the steps of:
    providing a length of pipe;
    electrically coupling a capacitance between said pipe and non-welded metal to be deposited on to said pipe;
    depositing on the outer circumference of said pipe a layer of molten weld metal by repeatedly (i) inductively charging said capacitance when said non-welded metal is out electrical communication with said pipe and then (ii) bringing a portion of said non-welded metal into electrical communication with said pipe to discharge said capacitance through said non-welded metal whereby to deposit said metal portion onto said pipe as a portion of a said layer of molten weld metal while pinching off said metal portion from the rest of said non-welded metal;
    depositing a first plurality of successive said layers of molten weld metal each having a substantially common first edge and successively decreasing width;
    continuing the deposition of said first plurality of layers of molten weld metal until a sufficient amount of metal is deposited to permit the machining of a radius joining said flange to said pipe; and
    thereafter depositing a second plurality of successive said layers on said first plurality of layers, each of said second layers being of substantially the same width to form said flange, each of said second layers having a first edge substantially common with the first edge of the underlying first layers of weld metal thereby forming a generally flat forward face of said flange opposite said radius.

5. A method of forming a stub end including a flange at one end thereof comprising the steps of:
    providing a length of pipe;
    electronically coupling a capacitance between said pipe and a length of weld wire;
    continuously rotating said length of pipe;
    inductively charging said capacitance when the end of said length of wire is out of electrical communication with said pipe;
    discharging said capacitance through said weld wire to establish an arc between said end of said length of weld wire and said pipe by bringing said end into electrical communication with said pipe whereby to deposit said weld wire end as molten weld metal onto said pipe while pinching off said end from the rest of said weld wire;
    continuously feeding weld wire to said arc;
    shielding said arc from surrounding air;

depositing on the outer circumference of said rotating pipe a first layer of molten weld metal by oscillating said weld wire a predetermined distance on either side of a fixed first center line thereby forming an annular layer of weld metal on said pipe having a first edge and a second edge;

shifting the said end of said weld wire away from said pipe and shifting the center line of said weld wire toward said first edge of said first layer to a fixed second center line and depositing a second layer of molten weld metal on said first layer by oscillating said weld wire a predetermined distance on either side of said second center line to form said second layer of weld metal having a first edge common with said first edge of said first layer and second edge offset toward said second center line with respect to said second edge of said first layer;

successively shifting said end of said weld wire away from said pipe and successively shifting the center line of said weld wire toward said first edges of said layers and oscillating said weld a successively decreasing distance about said shifted center lines to deposit successive layers of molten weld metal on underlying layers of weld metal, each said successive layer having a first edge common with said first edge of the underlying layer and a second edge offset toward said shifted center lines with respect to said second edge of the underlying layer, thereby depositing an amount of weld metal sufficient to permit the machining of a radius joining said flange to said pipe;

thereafter depositing successive layers of molten weld metal by successively shifting said end of said weld wire from the pipe and oscillating said weld wire a predetermined distance on either side of a fixed center line, said successive layers having a first edge common with the first edges of the underlying layers and having a second edge common with each other but offset toward the first edge with respect to the second edges of the underlying layers; and continuing deposition of said successive layers to form said flange of predetermined outer diameter having a substantially flat forward face.

6. The method of claim 5 wherein said steps are carried out at a plurality of locations spaced along the length of said pipe and including the further step of cutting through said pipe at the junction of the pipe and the forward faces of said flanges to form a plurality of stub ends.

* * * * *

UNITED STATES PATENT AND TRADEMARK OFFICE
CERTIFICATE OF CORRECTION

PATENT NO. : 4,857,693
DATED : August 15, 1989
INVENTOR(S) : Jerome R. Rump

It is certified that error appears in the above-identified patent and that said Letters Patent is hereby corrected as shown below:

Col. 1, line 41, "o" should be --of--.

Col. 5, line 64, "pipeformed" should be --pipe formed--.

Col. 6, line 14, between "Nos." and "3,136,884", insert --2,800,571--.

Col. 8, line 11, "an", second occurrence, should be --and--.

Col. 8, line 26, between "out" and "electrical", insert --of--.

Col. 9, line 21, between "weld" and "a", insert --wire--.

Col. 10, line 23, "junction" should be --juncture--.

Signed and Sealed this

Seventh Day of August, 1990

*Attest:*

HARRY F. MANBECK, JR.

*Attesting Officer*     *Commissioner of Patents and Trademarks*